United States Patent [19]

Lueders et al.

[11] 4,107,262
[45] Aug. 15, 1978

[54] CUPRION PROCESS START-UP CONTROL

[75] Inventors: Robert E. Lueders, Needham; Roger N. Kust, Acton; David S. Davies, Andover, all of Mass.

[73] Assignee: Kennecott Copper Corporation, New York, N.Y.

[21] Appl. No.: 500,494

[22] Filed: Aug. 26, 1974

[51] Int. Cl.² ............... C01G 3/14; C01G 51/12; C01G 53/12
[52] U.S. Cl. ............................ 423/32; 423/49; 423/53; 423/150; 423/DIG. 4
[58] Field of Search ............... 423/27, 32, 41, 53, 423/150, 49

[56] References Cited
U.S. PATENT DOCUMENTS 936,762  10/1909  Crispo ................................ 423/41

OTHER PUBLICATIONS

Journal of the American Chemical Society, vol. 43 (Jan. 1921) No. 1, pp. 1-11.

Primary Examiner—Brian Hearn
Attorney, Agent, or Firm—John L. Sniado; Anthony M. Lorusso

[57] ABSTRACT

A process in which copper, nickel, cobalt and molybdenum are recovered by reducing comminuted raw manganese nodules with an aqueous solution containing cuprous ions. An improvement is disclosed in which copper is oxidized to provide a starting solution of cuprous ions for the process. In one important embodiment of the invention wet copper cement is added to a solution of carbon dioxide and ammonia and ground manganese nodules are then added to the mixture. As a result, a starting solution containing cuprous ions is produced. A major advantage gained from utilizing manganese nodules as an oxidizing agent is that the manganese nodule is itself reduced and its metal values are added to the reaction solution.

9 Claims, 1 Drawing Figure

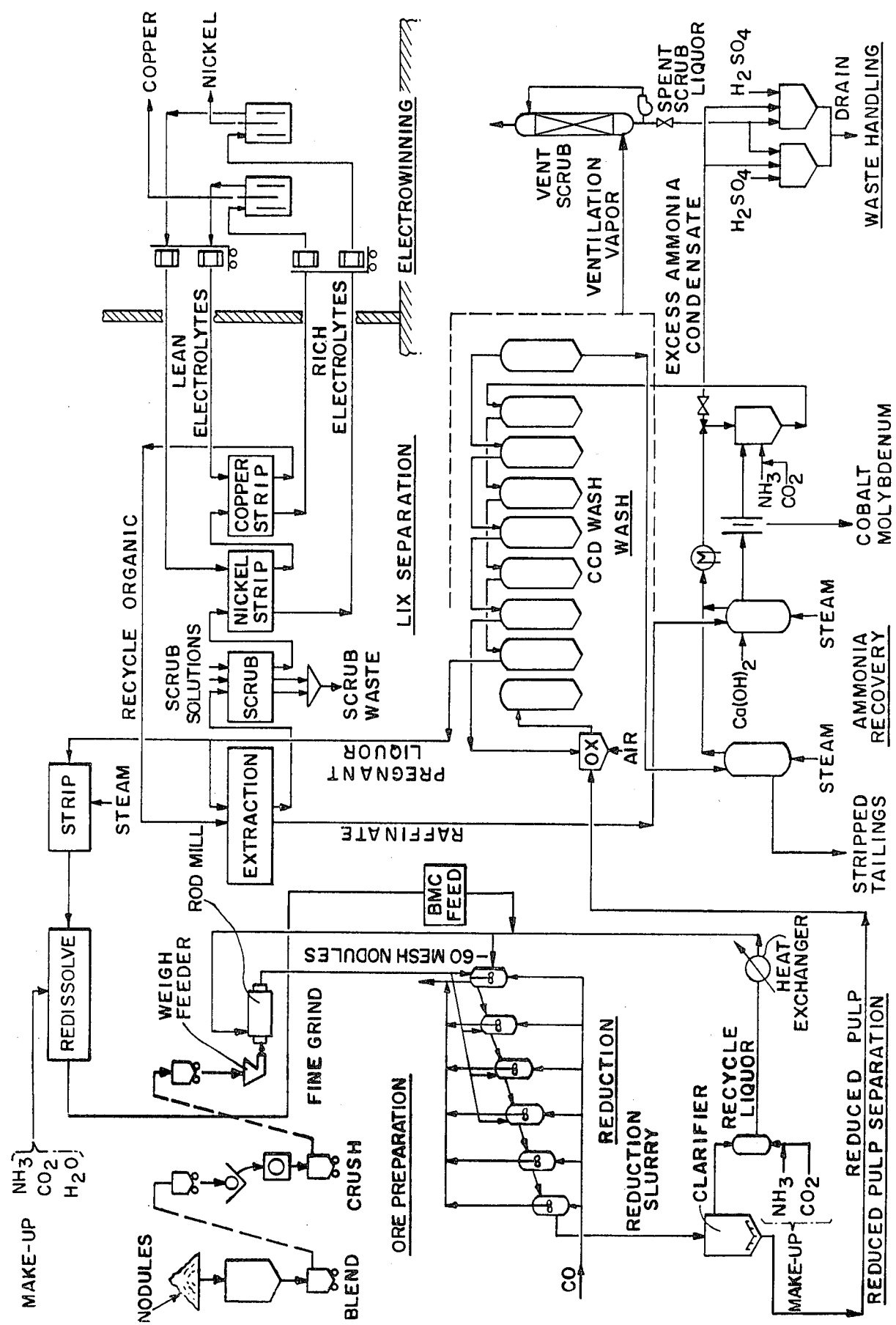

CUPRION PROCESS START-UP CONTROL

BACKGROUND OF THE INVENTION

In patent application Ser. No. 311,063 entitled "Recovery of Metal Values from Manganese Deep Sea Nodules", filed on Dec. 1, 1972, by Lester J. Szabo, the teachings of which are incorporated herein by reference, a process is disclosed in which copper, nickel, cobalt and molybdenum are recovered from raw manganese nodules with an aqueous ammoniacal leach solution containing cuprous ions. The process disclosed in application Ser. No. 311,063 is a significant breakthrough in the metallurgical art in that it significantly expands the world's source of copper, nickel, cobalt and molybdenum. The process disclosed in application Ser. No. 311,063 has come to be called the "cuprion" process.

The cuprion process for recovering copper, nickel, cobalt and molybdenum from manganese deep sea nodules includes the step of contacting ground manganese nodules with an ammoniacal leach solution containing cuprous ions in a reaction vessel to reduce the manganese oxides in the nodules to enable metal values such as copper, nickel, cobalt and molybdenum to be solubilized. The nodule residue is washed with an ammoniacal ammonium carbonate solution to remove these entrained metal values from the residue. The reduction liquor can be recycled to the reaction vessel in which the manganese nodules are added. To maintain a sufficient amount of cuprous ions, a reducing gas, such as carbon monoxide, is passed through the reaction vessels.

To commence the process disclosed in patent application Ser. No. 311,063, the cuprous ions may be charged into the reactors by adding a cuprous salt or by reducing cupric salts to obtain the cuprous ions.

The major disadvantage of the known prior art startup procedure is that it is slower than the start-up of the present invention. Furthermore, the start-up procedure of the process disclosed in patent application Ser. No. 311,063 is more expensive than the process of the present invention because it necessitates the use of increased amounts of carbon monoxide or other chemicals such as cuprous salts.

SUMMARY OF THE INVENTION

In accordance with the process of the present invention, an oxidant such as air, oxygen, raw nodules, or any other compound releasing oxygen to the system, is employed to oxidize elemental copper and thus provide the cuprous ions necessary for the cuprion process. The advantages gained from the start-up procedure of the present invention is increased safety, faster start-up in the reduction system and savings by utilizing less carbon monoxide and other chemicals. Furthermore, by generating start-up cuprous ions in accordance with the present invention from raw nodules as the start-up cuprous ions are being generated, a system results that is already loaded with solids from which metal values can be leached.

Accordingly, it is an object of the present invention to provide an improved process for producing start-up cuprous ions for the cuprion process.

A further object of the present invention is to provide a start-up procedure for the cuprion process which is faster than the known prior art start-up procedures.

A further object of the present invention is to provide a start-up procedure for the cuprion process in which the amount of carbon monoxide that is used in the known prior art start-up procedure is reduced.

Yet another object of the present invention is to provide a start-up procedure for the cuprion process in which cuprous ions are produced by oxidizing metallic copper with manganese nodules.

BRIEF DESCRIPTION OF THE DRAWING

The sole FIGURE of the drawing is a flow sheet illustrating the process of the present invention.

DESCRIPTION OF THE PREFERRED EMBODIMENTS

At the outset, the process of the present invention is described in its broadest overall aspects with a more detailed description following. The present invention is directed to the recovery of metal values from managanese deep sea nodules. For the purpose of this patent specification and claims, complex ores which are found on the deep sea floor of oceans and lakes containing manganese, iron, copper, nickel, molybdenum, cobalt and other metal values are variously referred to as deep sea manganese nodules, manganese nodules or nodules.

Ocean floor deposits are found as nodules, loose-lying at the surface of the soft sea floor sediment, as grains in the sea floor sediments, as crusts on ocean floor hard rock outcrops, as replacement fillings in calcareous debris and animal remains, and in other less important forms. Samples of this ore material can readily be recovered on the ocean floor by drag dredging, a method used by oceanographers for many years, or by deep sea hydraulic dredging, a method that could be used in commercial operations to mine these deposits. Mechanical deep sea nodule harvesters are described in U.S. Pat. Nos. 3,480,326 and 3,504,943.

The character and chemical content of the deep sea nodules may vary widely depending upon the region from which the nodules are obtained. The Mineral Resources of the Sea, John L. Mero, Elsevier Oceanography Series, Elsevier Publishing Company, 1965, discusses on pages 127–241 various aspects of manganese nodules. for a detailed chemical analysis of nodules from the Pacific Ocean see pages 449 and 450 in the Encyclopedia of Oceanography, edited by R. W. Fairbridge, Reinhold Publishing Corp., N.Y. 1966, and U.S. Pat. No. 3,169,856. For the purpose of this invention the complex ores will be considered as containing the following approximate metal content range on a dry basis:

| METAL CONTENT ANALYSIS RANGE | |
|---|---|
| Copper | 0.8 – 1.8% |
| Nickel | 1.0 – 2.0% |
| Cobalt | 0.1 – 0.5% |
| Molybdenum | 0.03 – 0.1% |
| Manganese | 10.0 – 40.0% |
| Iron | 4.0 – 25.0% |

The remainder of the ore consists of oxygen as oxides, clay minerals with lesser amounts of quartz, apatite, biotite, sodium and potassium feldspars and water of hydration. Of the many ingredients making up the manganese nodules, copper and nickel are emphasized because, from an economic standpoint, they are the most significant metals in most of the ocean floor ores.

In the cuprion process, raw manganese deep sea nodules are reduced with cuprous ions (Cu+) in an aqueous ammoniacal ammonium carbonate solution. The cuprous ions reduce the manganese in the nodules which enable metal values such as copper, nickel, cobalt and molybdenum to be dissolved while leaving undesirable metals such as iron in the solid residue. In the reduction process, the manganese dioxide in the deep sea nodules is reduced by cuprous ions to manganese carbonate according to the reaction $$MnO_2 + 2 Cu(NH_3)_2^+ + 4 NH_3 + CO_2 + H_2O \longrightarrow \tag{1}$$

$$MnCO_3 + 2 Cu(NH_3)_4^{2+} + 2 OH^-$$

Cupric ions indicated in equation (1) are reduced back to the cuprous state with carbon monoxide according to the reaction $$2 Cu(NH_3)_4^{2+} + CO + 2 OH^- \longrightarrow \tag{2}$$

$$2 Cu(NH_3)_2^+ + 4 NH_3 + CO_2 + H_2O$$

Cuprous ion is consumed in reaction (1) and is regenerated by reaction (2). The net overall reaction for the reduction process is the sum of equation (1) and (2), or equation (3)

$$MnO_2 + CO \rightarrow MnCO_3 \tag{3}$$

Quite obviously, in order to reduce the manganese nodules, it is necessary to provide a supply of cuprous ions. Furthermore, the cuprous ion concentration should preferably be above 2 gpl.

Two basic routes to achieve required start-up conditions are: (1) the use of metallic copper in the form of cement copper, copper scrap, or any other metallic form, and (2) the use of copper compounds such as $CuCO_3$, $CuCl_2$, $CuSO_4$, or any other copper compound.

In case (1) the metallic copper is added to the $(NH_4)_2CO_3$ liquor and is partially dissolved by adding an oxidant to the system. The oxidant can be air, oxygen, nodules, or any other compound releasing oxygen to the system. Chemically, the copper will dissolve stoichiometrically with the amount of available oxygen forming a cupric amine complex. When the oxidant is fully reacted, additional copper can be added which will react with the cupric ion to form cuprous ion. All the copper with insufficient oxidant to convert the copper to the soluble amine complex can be added all at once to achieve the same result. It is possible by adjusting the copper-oxidant ratio to produce any desired cuprons ion to total copper ratio in the system as needed.

In case (2) the copper directly dissolves as a soluble copper compound. Metallic copper can be added as in case (1) to produce cuprous ion.

In both cases after copper is in solution as cupric ion, carbon monoxide can be put into solution to convert cupric ion to the cuprous form.

In the preferred embodiment of the present invention the supply of cuprous ions is produced by oxidizing copper metal with manganese nodules. The principle reaction which takes place when the copper metal is oxidized by the nodules is set forth below.

$$2 Cu + MnO_2 + CO_3^= + 2H_2O \longrightarrow \tag{4}$$

$$2 Cu^+ + MnCO_3 + 4OH^-$$

More specific details of the start-up procedure for producing cuprous ions by using manganese nodules to oxidize copper is set forth below in the section entitled "START-UP".

In order to maintain the cuprous ion concentration fairly high at all levels of the process, the nodule feed stock is injected at multiple points. This multipoint injection facilitates the regeneration of cuprous ions by reducing the possibility that the nodules will exhaust the supply of cuprous ions by reacting with them.

The process of the present invention is further illustrated by the following example in conjunction with the sole figure of the drawing. At the outset, however, it is emphasized that the following description relates to a procedure that has been performed in a pilot plant. By extrapolating the results obtained from the pilot plant, however, one skilled in this art can design a commercial plant for processing large quantities of nodules.

The pilot plant was designed for one half tons per day nodule throughput, based on a 3½ percent solid slurry and with up to a three hour hold-up in the reduction section.

The process performed in the pilot plant can be broken down in the following sections:
1. Ore Preparation
2. Reduction-Leach
3. Oxidation and Wash-Leach
4. Liquid Ion Exchange Separation of the Metals
5. Electrowinning

ORE PREPARATION

The nodules utilized in the pilot plant process are received in 55 gallon drums in the condition that they are in after being mined from the deep sea ocean bottom. To facilitate processing in the pilot plant, the nodules are air dried. After they are dried, they are then blended, using the "cone and quarter"technique before going into the primary crushing circuit. The primary crushing circuit consists of a crusher such as a Jacobson "Full Nelson" to reduce the raw nodules to minus one inch. Thereafter, the nodules are passed through a Stedman double row cage mill to reduce the ore further to minus 6 mesh. The nodules are then conveyed away on a belt feeder to drums for storage or further processing.

The second grinding circuit is the final stage of ore preparation before the nodules enter the reduction stage. This circuit consists of a hopper, filled from the drums of cage milled ore, located on top of a hydraulic weigh feeder. The weigh feeder is used to meter nodules at a given rate into an open circuit rod mill for final grinding. The rod mill reduces the nodules from a particle size of minus six mesh to a particle size of approximately minus 60 mesh. As the nodules enter the rod mill, they are wetted with a synthetic sea water which brings the nodules up to approximately 40% moisture. This moisture content approximates the moisture which would be present in nodules as they are brought up from the sea bottom. At this point it should be noted that in a commercial operation the nodules would be processed directly after being mined from the ocean bottom, thus, the foregoing steps of drying and wetting the nodules would be unnecessary. However, for purposes of a pilot plant operation it was found convenient to air dry the nodules and later wet the nodules so that they had a moisture content equivalent to that of freshly mined nodules.

It has been found advantageous to add recycle reduction liquor to the rod mill. In a commercial process recycle liquor can be added to the grinding mill in order to provide a liquor to facilitate grinding and reduce the dust problem without introducing more water into the circuit which would cause undesirable dilution. Of course the recycle reduction liquor is advantageous in maintaining the proper copper concentration in the reduction circuit as well to provide liquor which is useful in the grinding process itself. Details of the recycle liquor circuit are amplified below.

REDUCTION - LEACH

The reduction-leach portion of the pilot plant is the location where the nodules are chemically reacted to make the metals of interest soluble in a strong ammoniacal ammonium carbonate solution. This is accomplished by reducing and converting the $MnO_2$ in the nodules to $MnCO_3$.

After leaving the rod mill, the nodules are passed through a conduit into a vibrator (not shown). The purpose of the vibrator is to remove any tramp material. The vibrator utilized is a Sweco vibrating screen. The material that enters and leaves the vibrator is actually a liquid slurry. Connected to the vibrator is a surge tank (not shown). The purpose of the surge tank is to serve as a storage unit so that the process plant won't have to be shut down in the event that there is a malfunction in some piece of ore preparation machinery. After leaving the surge tank, a feed pump pumps the slurry to the reduction circuit.

The reduction circuit includes six reactors connected in series. These reactors are 60 gallon capacity reactors which are used to a 42 gallon capacity in the actual processing. Each reactor is formed of 316 stainless steel and are outfitted with agitators, pressure gages, level alarms, and gas sparging equipment.

Gas sparging is directed underneath the agitator from the bottom of the reactor where a reduction gas containing 95 percent carbon monoxide and 5 percent hydrogen is introduced. This mixture is used because it is similar to a reduction gas mixture that is available in commercial quantities. Of course, hydrogen is unnecessary in the process. Indeed, the only gas necessary for the process is carbon monoxide. The off gas coming out of the reactors first goes through condensers which remove some of the water in the gases before going to off gas rotometers which give an indication of the amount of gases coming out of a reactor. The off gases go through an ammonia scrubber and are exited to the atmosphere.

The reactors themselves are outfitted with gravity overflows so that there is a cascading system from the first through the sixth reactor. Each of the first four reactors is fed an equal amount of feed stock. That is, 25 percent of the slurry being pumped from the ore preparation circuit will go into each of the first four reactors. It should be noted, however, that there are a large number of possible ways of accomplishing multipoint injection. That is, the nodule slurry can be injected into two, three, five or more reactors and the amount of slurry going into any given reactor need not be equal to the amount going into the others. It has been found advantageous, however, that there be no nodule injection into at least the last reactor. That is, each portion of nodules should pass through two stages in progression, therefore, there should be no nodule injection in the last stage. It should be noted that in the pilot plant process there is no nodule injection in the last two stages. Each reactor contains a mechanical impeller to achieve mechanical agitation which disperses the gas and suspends the solids. It has been established that the reaction rate of cuprous ion regeneration is influenced by gas-liquid mass transfer rate of carbon monoxide. The rate is affected primarily by the extent of gas-liquid interfacial area, which is in turn affected by the method used to disperse the gas.

While the nodules are fed to the first four reactors, carbon monoxide is sparged into the bottom of each reactor as required. The slurry in the fifth and sixth reactors is approximately 3.5 precent solids and the average residence time in the system is 20 minutes per stage. The slurry overflowing the last reactor is flocculated to enhance settling before entering a clarifier. The clarifier is used to separate the liquid from the solids.

The reduction-leach circuit also includes a gas metering system. As set forth above, the reducing gas is 95 percent carbon monoxide and 5 percent hydrogen. It has also been found advantageous to include a 1 percent methane tracer in the reducing gas. The methane was used as an aid in establishing material balances. The reducing gas is fed from portable cylinders through a pressure reducing valve and a gas totalizer. The gases are metered individually to each of the six reactors as required to maintain the cuprous ion within various control ranges. The gases are also sampled by gas chromatographs.

START-UP

The process is directed toward a continuous process in which nodules are continuously processed to produce various desirable metals. In order to reach a continuous steady state, the reactor vessels must be loaded with start-up materials. Thus, each of the six reactors are filled with an ammonia-ammonium carbonate solution containing approximately 100 grams per liter total ammonia and approximately 15 grams per liter total carbon dioxide. After the reactors are filled with the ammonia-ammonium carbonate solution, copper metal is added and is partially oxidized. The metal is added as a copper powder (cement copper) and is oxidized to convert some of the copper to cuprous ions. Enough copper metal is added so that 10 grams per liter copper in solution results after copper dissolution. In accordance with the present invention, the copper metal is oxidized with fresh nodules. The next step in the start-up procedure is to check the cuprous ion concentration. Thus, the mixture in each reactor is analyzed to make sure that the cuprous ion concentration is at an acceptable level of at least about 7 grams per liter. If there is an excess amount of cupric ions, more cuprous ions are needed, the cupric ions can be converted to cuprous ions by passing the reducing gas through the bottom of the reactor. The first three reactors have pH control loops which consist of a finger pump which pumps the solution to a housing which contains a pH electrode. The pH is then measured in a readout on a control panel. The pH is a valuable control device and can be used to indicate whether or not the carbon dioxide, ammonia or cuprous ions have gone off the specified limits. The preferred operating procedure is as follows:

1. Prepare a leach solution containing 100 g/l $NH_3$ and 15 g/l $CO_2$. Transfer the leach solution to a pregnant liquor surge tank from which it can be pumped into the reduction circuit as it is needed.

2. Pump the leach solution to fill the $NH_3 - CO_2$ makeup reactor and the 1st stage reactor.

3. Start the ore preparation using leach solution metered from the pregnant liquor tank to provide milling liquor.

4. Manually add cement copper through a vent connection in the rod mill discharge hood. The copper is added in discreet increments every 5 to 10 minutes in quantities to provide a nodule/cement copper ratio of 1.78.

5. Start slow $N_2$ purge of all reactors to increase the efficiency of the reaction between the copper and nodules. Continue the addition of copper metal and nodules so that each reactor contains about 10 g/l of copper metal. When the copper level in the first reactor reaches 10 g/l or when the stoichiometric amount of copper has been pumped in to the 1st stage reactor, recirculate the leach liquor. The nodule-cement copper mixture has been calculated to make a slurry containing about 2% solids by weight.

6. Continue pumping solids and fresh leach solution to the first stage reactor allowing the slurry to overflow and fill the subsequent stages. Agitation should be started in each reactor when the slurry reaches the fill level. Continue pumping fresh solution to the makeup reactor from the solution holding tank.

7. Purge the leach slurry clarifier and the leach solution surge tank with nitrogen to prevent reoxidation of the cuprous ions in solution. When the reactors are full, the leach slurry will overflow to the clarifier. Flocculant system may be started into the leach slurry at this point to assist in settling solids and to reduce risk of overthickening. 0.05 lbs/ton of nodules of a higher molecular wieght polyacrylamide flocculant such as hercofloc 819 is used in the clarifier.

8. When the clarifier is filled, it will overflow to the surge tank. When the surge tank is filled to approximately the halfway level, stop feeding fresh leach solution. Then stop feeding cement copper as the system is now charged with the necessary copper.

9. Check $Cu^+$ levels in all reactors. Start reducing gas until the desired $Cu^+$ levels (7 g/l) are attained. The system is now ready to begin feeding nodules and reduction gas.

It should be noted that the reaction stoichiometry between cement copper, or any copper source, and nodules must be controlled to attain a final desired cuprous ion level in the reduction liquor. The normal desired cuprous ion level is 80 percent of the total copper level and by reacting 5 moles of copper contained in cement copper with 3 moles of $MnO_2$ contained in manganese nodules, the desired result can be obtained. The following equation shows the stoichimetry of the reaction:

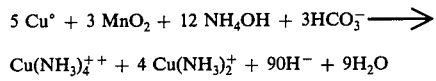

$$5\ Cu° + 3\ MnO_2 + 12\ NH_4OH + 3HCO_3^- \longrightarrow$$
$$Cu(NH_3)_4^{++} + 4\ Cu(NH_3)_2^+ + 9OH^- + 9H_2O$$

Another feature of stoichiometric control is that any cuprous-cupric ion ratio can be predicted and obtained by proper adjustment of stoichiometry. Provision for oxygen contained in cement copper and $MnO_2$ availability of manganese nodules is required.

After the reactor vessels have been locked for start-up as set forth above, the manganese nodules are added to the first four reactors. The total rate of feed to the four reactors is about 30 pounds per hour of nodules. As the nodules are being fed into the reactors, carbon monoxide is sparged through the bottom of the reactors at a total rate of about 70 standard cubic foot per hour. At this point it should be noted that the amount of carbon monoxide that is fed into each stage of the reactor is controlled by the cuprous ion concentration of the contents of any given reactor. This is determined by analyzing the contents of the reactor periodically. During start-up, this is done every half hour and is continued once an hour while the process is in the steady state stage.

Approximately 120 gallons per hour of reduction slurry enters the clarifier. The solids leave the bottom of the clarifier in the form of a slurry with approximately a 40 percent solids content. The overflow from the clarifier is clear liquid which constitutes the recycle reduction liquor. However, after leaving the clarifier, the recycle reduction liquor enters a surge tank whereupon it is passed into an ammonia makeup unit. Gaseous ammonia and carbon dioxide are sparged into the ammonia makeup unit in order to keep the ammonia and carbon dioxide content of the liquid at a prescribed level. At steady state, that level is approximately 100 grams per liter ammonia and the $CO_2$ content is about approximately 25 grams per liter. After leaving the makeup unit, the liquid is pumped by a metering pump through a heat exchanger into the first reactor and the grinding mill. The heat exchanger removes heat that was generated in process.

A small stream of basic metal carbonate (BMC) containing primarily copper and nickel carbonates can also be recycled to the first stage if required to maintain the total copper in the reduction system at an acceptable level. This stream of basic metal carbonate compensates for unsolubilized copper leaving the reduction loop in the clarifier underflow. Details of the BMC recycle are amplified below.

OXIDATION AND WASH-LEACH

In the oxidation and wash-leach circuit, the clarifier underflow is combined with second stage wash liquor and the resulting slurry is oxidized with air to convert the cuprous ion in the clarifier underflow to cupric ion to facilitate future processing. The oxidized slurry is then pumped to a countercurrent decantation system (CCD) consisting of seven stages of countercurrent washing units. The wash-leach steps are carried out on a batch basis in nine tanks. It should be noted that in the pilot plant nine stages are used to simulate a countercurrent wash system. Although this system is not truly a countercurrent, it has been able to demonstrate that a seven reactor countercurrent system is advantageous. The two extra units used in the pilot plant are necessary because one unit is either being filled or is being emptied. In the wash-leach system, the metal solubilization is completed as the displacement wash process is carried out. Fresh wash liquor is added to the seventh stage of the system as a solution containing 100 grams per liter ammonia and 100 grams per liter carbon dioxide. Liquor is transferred from one tank of the settled slurry every 12 hours to another appropriate tank in the system to affect the countercurrent washing. The carbon dioxide concentration varies throughout the washing system and exists in the pregnant liquor which contains approximately 65 grams per liter $CO_2$. This decrease in $CO_2$ concentration is due to the fact that the slurry entering the oxidation and wash-leach circuit has a liquor phase which contains only 25 grams per liter $CO_2$. Pregnant liquor, containing the metal to be recovered, is decanted from the first wash stage and pumped to a surge tank. Fresh ammonia solution without metals is added to the last solids wash stage. The metal values in solution range from approximately 0 in the fresh wash liquor to between 4 – 8 grams per liter copper and 5 – 10 grams per liter nickel in the pregnant liquor. Of course, other metal values are also present in the pregnant liquor but nickel and copper are the major metal values of interest.

After the wash-leach step, the pregnant metal bearing liquor is piped off for further processing as is explained below. The second stage wash is recycled back to the oxidation reactor. The tailings, which are nothing more than reduced nodules washed of most of their non-ferrous metal values and with the manganese converted to manganese carbonate, are sent to a surge tank (not shown). From the surge tank, they are pumped to a steam stripping operation where the ammonia and $CO_2$ are driven off. The trailings are then drummed. The ammonia and $CO_2$ obtained in the steam stripper may be recycled.

BMC RECYCLE

A portion of the pregnant liquor from the oxidation and wash-leach circuit is steam stripped on a batch basis to remove ammonia and carbon dioxide and to precipitate the basic metal carbonates. The precipitated basic metal carbonates are dissolved in an aqueous solution containing approximately 60 g/l $NH_3$ and 60 g/l $CO_2$. This BMC feed is pumped to the first stage of the reduction circuit.

LIQUID ION EXCHANGE SEPARATION

The pregnant liquor contains various metal values including copper, nickel, cobalt and molybdenum. In the liquid ion exchange separation circuit, the object is to separate the copper, nickel, cobalt and molybdenum from each other and from the pregnant liquor. Initially, the copper and nickel are coextracted by an organic extractant in a series of mixer/settler units. The organic extractant is LIX-64N in a kerosene base. LIX-64N is an extractant sold by General Mills Chemicals, Inc.

The copper and nickel free liquor (raffinate) is sent to a storage tank before it is steam stripped.

The organic extractant which contains copper and nickel values is washed with an $NH_4HCO_3$ solution followed by an ammonium sulfate solution to remove ammonia picked up during extraction. This scrubbing operation is carried out in another series of mixer settlers. The organic extractant is then stripped with a weak $H_2SO_4$ solution (pH about 3) to preferentially remove nickel. Thereafter, the copper is stripped, which is accomplished by using a stronger (160 g/l) $H_2SO_4$ solution. The copper and nickel free organic extractant is recycled to the metal extraction circuit of the LIX process.

The raffinate which contains only cobalt, molybdenum and some trace impurities that were not extracted into the organic phase is sent into a surge tank for future processing to recover cobalt and molybdenum. In the cobalt and molybdenum recovery circuit, the ammonia and $CO_2$ are stripped from the raffinate thereby precipitating cobalt. The ammonia and $CO_2$ are condensed and sent back to the process for recycling. The cobalt precipitate is separated from the liquor and the liquor is subsequently treated with hydrated lime to precipitate the molybdenum. The resulting slurry is agitated and then allowed to settle. The solution which no longer contains cobalt and molybdenum is recycled back to the process as fresh wash liquor. Ammonia and $CO_2$ are added to the solution to bring it up to the prescribed concentration. For further details of a liquid ion exchange procedure which can be employed, see U.S. application Ser. No. 266,985 entitled Selective Stripping Process by Roald R. Skarbo, filed June 28, 1972, the teachings of which are incorporated herein by reference.

ELECTROWINNING

Metal recovery is accomplished by electrowinning copper and nickel from the solution prepared in the LIX plant as described above. This process is performed on a batch basis for the copper recovery and on a continuous basis for the nickel recovery in a separate plant. The metal containing solutions are transferred once a day.

OPERATING PARAMETERS

A summary of operating parameters is set forth below.

| Actual Operating Parameters | |
|---|---|
| Nodule Feed Rate, lb. dry ore/hr | 30.8 |
| Nodule Particle Size | −60 Mesh |
| Retention Time, Min./Stage | 20 |
| Liquor Composition | |
| $NH_3$, g/l | 90–103 |
| $CO_2$, g/l | 10–14 |
| Total copper, g/l | 8.5–10 |
| pH (Measured at 50° C) | 10.4–10.8 |
| Recycle Liquor Flowrate, gal/hr | 128 |
| Recycle Liquor Temp. ° F | 122 |
| Temperature Gradient Over Reactor System, ° F | 10 |
| Feed Gas Purity, % CO | 93.5 |
| Feed Gas Flowrate, SCFH | 64.5 |
| Agitator Speed, RPM | 200 |
| Extent of Reduction, % | 94 |
| Overall Gas Utilization, % | 96 |
| Stability of Operation | Stable |
| Reacted Solids Particle Size | 83%-325 Mesh |

CONCLUSION

By following the teachings of the present invention, manganese nodules may be used to oxidize copper to provide a starting solution of cuprous ions for the cuprion process. Comparative amounts of nodules and copper for the pilot plant operation and a commercial plant are given below.

| | Pilot Plant | Commercial |
|---|---|---|
| Cement Copper Req'd (100% Cu Basis) | 57.5 lbs | 500 tons |
| Total Nodules Req'd (Dry Basis) | 102 lbs | 900 tons |
| Copper furnished from nodules | 1.0 lbs | |
| Total Copper | 58.5 lbs | |
| Nodule/Cement Copper Ratio | 1.78 | |
| Reactor Slurry Content | 2% solids (Dry Basis) | |
| $CO_2$ depletion of solution by precipitation of $MnCO_3$ | 5.7 gms/l | |

There are of course, variations that are apparent to those skilled in the art which can be employed to provide a start-up solution of cuprous ions. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process in which metal values selected from the group of copper, nickel, cobalt and molybdenum are recovered from manganese nodules by introducing the nodules into a reaction vessel containing an aqueous ammoniacal-ammonium carbonate solution and cuprous ions to allow the cuprous ions to reduce the manganese oxides in the nodules to enable the metal values to be solubilized and in which cuprous ions are continuously regenerated by a reducing gas wherein the improvement comprises providing a start-up solution of cuprous ions by oxidizing copper metal with the manganese nodules from which the metal values are to be recovered and recovering metal values selected from the group of copper, nickel, cobalt and molybdenum from the manganese nodules used to oxidize the copper metal to provide the start-up solution of cuprous ions.

2. The process as set forth in claim 1 wherein the copper metal is oxidized with the manganese nodules to provide the start-up solution of cuprous ions by steps comprising:
   (a) introducing an aqueous solution containing ammonia and carbon dioxide into a reaction vessel,
   (b) adding copper metal and the manganese nodules to the aqueous solution of ammonia and carbon dioxide in the reaction vessel, and
   (c) oxidizing the copper metal with the manganese nodules to form a solution of cuprous ions.

3. The process as set forth in claim 2 wherein in step (a) an aqueous solution containing 100 g/l total ammonia and 15 g/l total carbon dioxide is introduced into the reaction vessel.

4. The process as set forth in claim 2 wherein in step (b) a sufficient quantity of copper is added to the solution to yield 10 grams per liter copper in solution.

5. The process as set forth in claim 4 including the step of reducing oxidized copper with a reducing gas to convert cupric ions to cuprous ions.

6. The process as set forth in claim 5 wherein the reducing step is controlled to yield a start-up solution containing 7 grams per liter of cuprous ions.

7. The process as set forth in claim 2 wherein in step (b) cement copper is added to the solution.

8. The process as set forth in claim 7 wherein the amount of cement copper and manganese nodules added in step (b) is sufficient to provide a nodule/cement copper ratio of 1.78.

9. The process as set forth in claim 7 where five moles of copper contained in cement copper is reacted with three moles of $MnO_2$ contained in manganese nodules to obtain a cuprous ion level which is 80% of the total copper level.

* * * * *